Patented Mar. 15, 1932

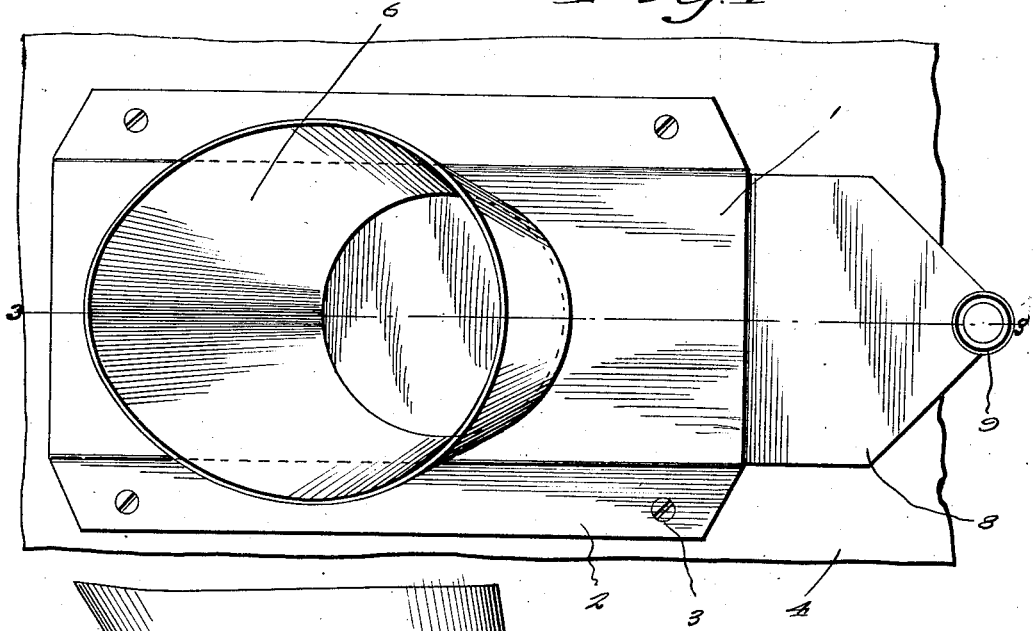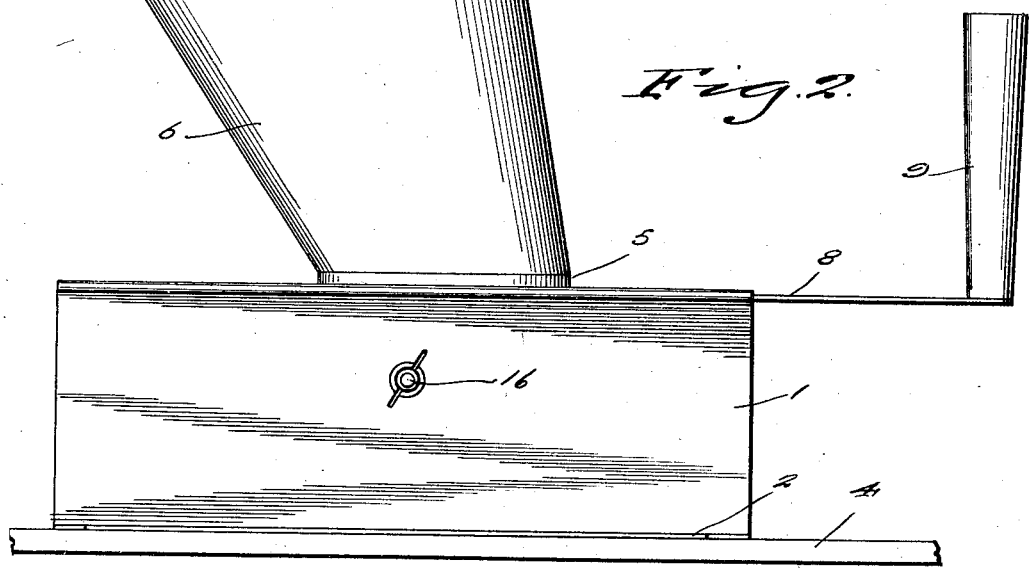

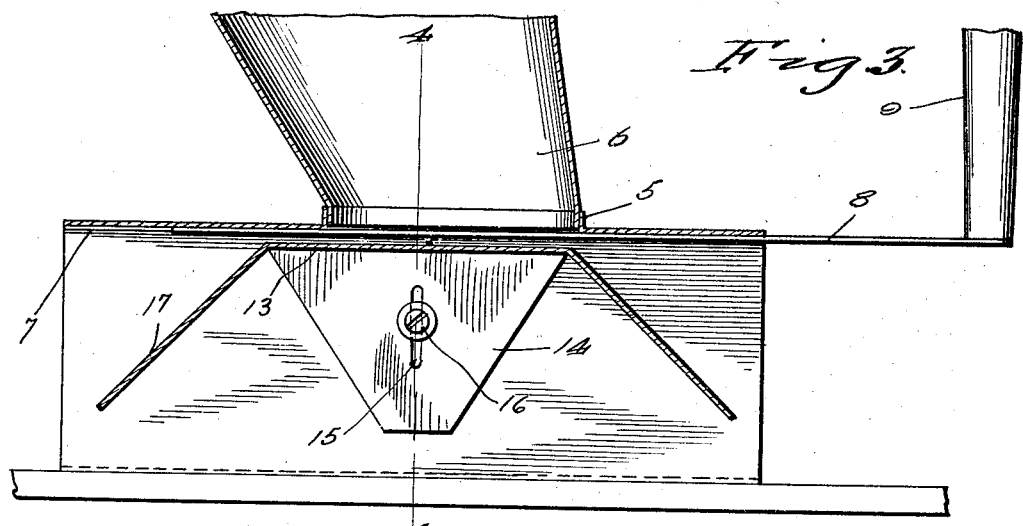
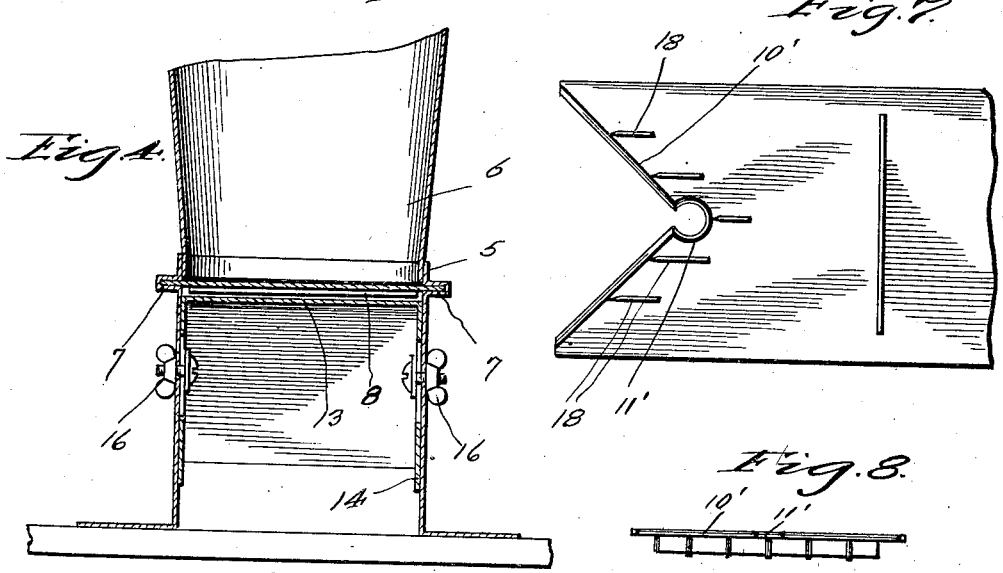
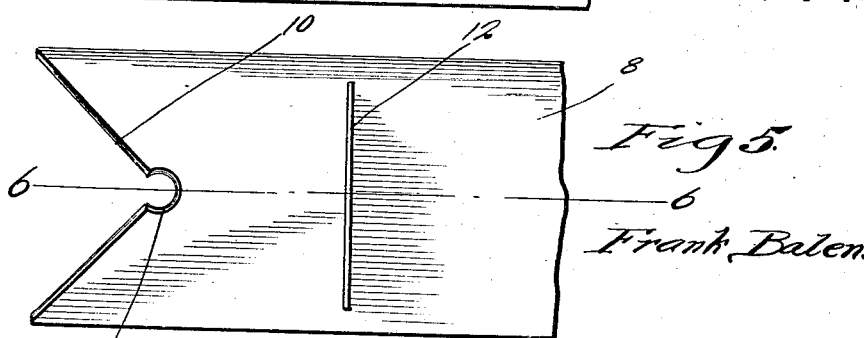

1,849,782

UNITED STATES PATENT OFFICE

FRANK BALENSIEFER, OF FOWLER, INDIANA

VEGETABLE SLICER

Application filed January 7, 1929, Serial No. 330,706. Renewed August 5, 1931.

This invention pertains to improvements in the class of vegetable slicers, and more specifically has reference to a hand operated potato slicer especially adapted for household use. This novel slicer is serviceable for preparing potatoes for cooking as French fried, or in the form of wafers to produce potato chips when fried.

The principal object of this invention is to provide a vegetable slicer, wherein the thickness of the slice to be taken may be predeterminedly regulated.

Another object of importance is to provide a vegetable slicer wherein the cutting blade may be entirely removed to permit the use of another blade of different construction for cutting a different style of slice.

Another object of importance is to provide a vegetable slicer having a blade operable to cut a slice from a potato and simultaneously slit the slice into a plurality of lengths.

These and other objects of the invention will become more apparent to the reader after considering the invention as described and claimed hereinafter.

In the drawings:—

Figure 1 represents a top plan view of the improved device.

Fig. 2 is a side elevation of the novel device.

Fig. 3 is a longitudinal fragmentary vertical view of the vegetable slicer, taken substantially on the line 3—3 of Fig. 1.

Fig. 4 represents a vertical transverse sectional view taken substantially on the line 4—4 of Fig. 3.

Fig. 5 is a bottom plan view of one of the cutter blades, the same being shown fragmentarily.

Fig. 6 is a longitudinal sectional view of the cutter blade, taken substantially on the line 6—6, of Fig. 5.

Fig. 7 is a fragmentary bottom plan view of a modified form of cutter blade, and Fig. 8 is an end elevation of the blade shown in Fig. 7, showing the depending blade for slicing the vegetable slice into a plurality of lengths.

Referring to the drawings, wherein like numerals designate like parts, the invention includes a hood or casing 1, constructed of sheet metal and bent to a form substantially U-shaped in cross section. The hood is substantially elongated and each longitudinal edge thereof is provided with a flange 2 through which fastening members 3 may be disposed for securing the hood to a suitable base 4.

The top of the hood 1 is formed with a circular opening around the edge of which an upstanding flange 5 is provided. Properly fitted within the flange 5 is an upwardly disposed substantially inverted frusto-cone shaped hopper 6.

The side walls of the hood 1 are laterally offset throughout their longitudinal legs to provide guideways 7—7. As is clearly shown in Fig. 3, the guideways serve to receive the longitudinal edge portions of the cutter blades 8. The cutter blade 8 is provided with an upstanding handle 9 at one end while its opposite end is provided with a V-cut out portion 10. The apex portion of this V-cut opens into a semi-circular opening 11, the edge portions of the V-cut 10 and the opening 11, being sharpened to provide cutting edges.

At a point inwardly from the cutting end of the blade 8 is a kicker plate 12, the purpose of which will be presently described. Referring again to Fig. 3, a platform 13 is supported by depending side pieces 14, formed with slots 15, through which fastening means 16, extending through the side walls of the hood 1 are fitted and adapted to be tightened for securing the platform 13 in a definite spaced relation beneath the top of the hood 1 and in underlying respects to the circular openings therein, an inclined slide plate 17.

In referring to Fig. 3, in describing the operation of this device, it will be seen that by moving the blade 8 toward the right, a potato may be placed within the trough 6, and permitted to rest upon the platform 13. By moving the cutting end of the blade 8, inwardly a slice will be cut from the potato. A continuing movement of the blade 8 will cause the kicker plate 12 to engage the slice and ultimately push the same beyond the end of the platform, so that the same will slide down the inclined plate 17.

The blade is again retracted so as to permit the potato to assume a position at rest upon the platform 13, after which, the slicing operation may be repeated.

Referring to Fig. 7 it will be seen that a slightly modified form of blade is shown which aside from being provided with the V-shaped cut out portion 10' and the semicircular opening 11' also is provided with a plurality of knife members 18, extending longitudinally inwardly from the V-shaped cut 10'.

The knife 18 will cut the slice of the potato into lengths simultaneously with the operation of slicing the potato. This type of blade is especially used in preparing the potato for French frying.

It will thus be seen that the present device provides a simple means for slicing the potatoes and will be highly practical for use in households. It is to be understood that certain changes in the specific shape, size, and materials, may be resorted to in the construction of the device without departing from the spirit and scope thereof as claimed hereinafter.

Having thus described my invention, what I claim as new is:—

A slicer of the character described comprising an inverted U-shaped hood having an opening in its top through which an article to be sliced may be fed, a platform mounted within the hood, said platform being provided with depending legs, adjustable means between each leg and the corresponding side of the hood, and a knife slidably interposed between the top of the hood and the platform for movement across the said opening, and a transversely disposed rib on the blade for displacing the sliced piece of the article from the platform.

In testimony whereof I affix my signature.

FRANK BALENSIEFER.